United States Patent Office 2,694,726
Patented Nov. 16, 1954

2,694,726

PROCESS FOR DEHYDROHALOGENATION OF DIHALOPROPIONIC ACID COMPOUNDS WITH AMINO ACIDS

Harry D. Anspon, Easton, Pa., assignor to General Aniline & Film Corporation, New York, N. Y., a corporation of Delaware No Drawing. Application October 24, 1950,
Serial No. 191,920

5 Claims. (Cl. 260—486)

This invention relates to an improved process for the preparation of esters, amides or nitriles of α-haloacrylic acids, by dehydrohalogenation of the corresponding esters, amides or nitriles of a dihalopropionic acid in which at least one of the halogens occupies the α-position.

More specifically, the invention relates to the preparation of an ester of an α-chloroacrylic acid by dehydrochlorination of the corresponding ester of α,β-dichloropropionic acid.

It has been proposed heretofore to prepare esters of α-haloacrylic acids by dehydrohalogenation of the corresponding esters of α,α- and α,β-dihalopropionic acids with alkaline-reacting materials such as sodium, potassium, calcium, or magnesium hydroxides, carbonates or bicarbonates (U. S. P. 2,245,547), or with carboxylic acid salts, such as sodium acetate (U. S. P. 2,476,528). The first of these processes is subject to serious drawbacks in that saponification of the esters occurs in the presence of the relatively strongly alkaline materials employed for dehydrohalogenation, resulting in serious losses in yield; and optimum results require addition of the alkaline reagent and removal of the α-haloacrylate ester formed at the rate of the formation of the latter ester, as well as limitation of the proportion of water to avoid forming a solution of the alkaline-reacting material. The second process has the drawback that the acetic acid produced contaminates the α-haloacrylic acid ester, and is extremely difficult to remove from this product. Traces of acetic acid have a serious softening effect on polymers produced from these esters.

I have discovered that the foregoing disadvantages can be avoided by reacting esters, amides and nitriles of the aforesaid dihalopropionic acids with an aqueous solution of an amphoteric amino acid such as glycine, alanine, 6-aminocaproic acid, β-aminopropionic acid, taurine, N-methyltaurine and sulfanilic acid. The amino acids employed are particularly those containing an equal number of acidic and amino radicals in the molecule.

When the aforesaid amino acids are employed, no substantial saponification of the dihalopropionic acid compounds or the corresponding α-haloacrylic acid compounds occurs. The amino acids are non-volatile, and insoluble in non-polar organic solvents suitable for extraction of the α-haloacrylic acid compounds produced. Hence, contamination of the products by the amino acids presents no problem. The dehydrohalogenation proceeds readily in aqueous solution at reflux temperatures, with high per cent conversion of the dihalopropionic acid compound and production of high yields of the corresponding α-haloacrylic acid compound.

In carrying out the process of this invention, it is desirable to employ at least 1 mol of amino acid per molecular equivalent of dihalopropionic acid in the dihalopropionic ester, amide or nitrile employed. Preferably, an excess of the amino acid is used, e. g., about 2 mols of amino acid per molecular equivalent of dihalopropionic acid compound. The reaction temperature may vary from 50 to 150° C. (superatmospheric pressure being used at temperatures exceeding the boiling point of the aqueous phase of the reaction mixture, so as to maintain the reaction mixture in liquid phase), but is preferably carried out at the boiling point of the aqueous solution, i. e., about 100° C. At temperatures within the aforesaid range, the reaction requires about 1 to 5 hours.

Since the α-haloacrylic acid compounds produced tend to polymerize readily, it is advantageous to include a small amount of a polymerization inhibitor in the reaction mixture. Suitable inhibitors are tertiary butyl catechol, p-phenylene-diamine, hydroquinone, picric acid, copper and copper compounds. Moreover, it is desirable to shield the reaction mixture from actinic light and to effect the reaction in an inert atmosphere, e. g., an atmosphere of nitrogen.

My invention is illustrated by the following examples, wherein parts and percentages are by weight.

*Example I*

157 parts (1.0 mol) of methyl α,β-dichloropropionate, containing 1.7 parts of tertiary butyl catechol as a polymerization inhibitor, were mixed with a solution of 150 parts (2.0 mols) of glycine in 600 parts of water, and the mixture agitated and heated for 1¼ hours at boiling temperature under reflux in an inert nitrogen atmosphere, while shielding the reaction mixture from actinic light. At the end of this period, the mixture was allowed to separate into an upper organic and a lower aqueous layer. The organic layer was removed and fractionally distilled, whereby it yielded 72 parts of methyl α-chloroacrylate, and 40 parts of unchanged methyl α,β-dichloropropionate. The conversion of methyl α,β-dichloropropionate amounted to 60% and the yield of methyl α-chloroacrylate was 80% of theory.

*Example II*

157 parts (1.0 mol) of methyl α,β-dichloropropionate, containing 1.7 parts of tertiary butyl catechol, were mixed with a solution of 300 parts (4.0 mols) of glycine in 1000 parts of water, and the reaction mixture agitated and heated for 1 hour in the same manner as in the preceding example. At the end of this period, the organic and aqueous layers of the mixture were separated, and the organic layer fractionally distilled. 53 parts of methyl α-chloroacrylate and 24 parts of methyl α,β-dichloropropionate were obtained. Conversion of methyl α,β-dichloropropionate amounted to 44%, and the yield of methyl α-chloroacrylate was 52% of theory.

The proportions, reaction temperature and duration in the foregoing examples can be varied within the ranges hereinbefore discussed to obtain similar results. The concentration of amino acid in the aqueous portion of the reaction mixture may be extremely small, but for reasons of economy and convenience, we prefer that the concentration of the amino acid in water be at least 10%, and may be increased to the limit of solubility of the amino acid at the temperature employed. Advantageously, the concentration is maintained above 10% throughout the reaction by use of an initial excess thereof. 1 to 4 mols of the amino acid per molecular equivalent of dihalopropionic acid in the derivative thereof undergoing reaction is satisfactory.

The organic amino acids employed are used in free acid form, and are especially those having an equal number of basic amino groups and acidic groups (e. g., carboxy and sulfonic acid groups). Instead of glycine, other amino carboxy acids can be used, such as alanine, β-aminopropionic acid, leucine, isoleucine, 6-aminocaproic acid, tyrosine, N-phenylalanine, proline, oxyproline, serine, valine, or methionine. Similarly, aminosulfonic acids such as taurine, N-methyltaurine and sulfanilic acid can be used with similar results. The amino groups of these acids can be primary, secondary or tertiary and are in free form (i. e., not acylated nor in the form of their salts with other acids).

The esters to which the process of this invention can be applied are esters of α,α- and α,β-dichloro-, dibromo- and -diiodopropionic acids, but are preferably esters of α,β-dichloropropionic acids. They include the alkyl esters such as methyl, ethyl, propyl, isopropyl, butyl, amyl, isoamyl, n-hexyl, octyl, lauryl and octadecyl esters of the aforesaid acids. In addition, there may be mentioned the corresponding alkenyl esters such as allyl, methallyl, crotyl, oleyl and chloroallyl esters. The process can also be applied to polyhydric alcohol esters of the aforesaid acids, e. g., to glycol, glycerol, sorbitol and mannitol esters, as well as to the aryl, aralkyl, cycloparaffinic and heterocyclic esters, as for example, phenyl, cresyl, resorcyl, naphthyl, benzyl, fenchyl, cyclohexyl and furfuryl esters. All of these esters yield the corresponding α-haloacrylic esters upon dehydrohalogenation by the procedure of the invention, e. g., as illustrated in the foregoing examples.

Moreover, the procedure of this invention is not only applicable to the testers of the aforesaid α,α- and α,β-dihalopropionic acids, but also to the corresponding nitriles, amides and N-mono- and disubstituted amides in which the nitrogen substituents can be aliphatic, araliphatic, cycloaliphatic, aromatic or heterocyclic, as for example, mono- and dimethylamides, mono- and diethylamides, the β-hydroxyethylamides, the cyclohexyl- and cyclohexylmethylamides, the benzyl- and benzylmethylamides, the anilide, the morpholide or piperidide of α,β-dichloropropionic acid. These compounds, like the esters, yield the corresponding nitriles, amides, and N-substituted amides of the corresponding α-haloacrylic acids by the same procedure as that employed for the esters of these acids.

The α-haloacrylic esters and nitriles produced in accordance with this invention which are volatile can be recovered from the reaction mixture by distillation, e. g., steam distillation. The relatively non-volatile amides and higher esters are best recovered by extraction of the reaction mixture with organic non-polar solvents which are miscible or substantially immiscible with water.

Variations and modifications which will be obvious to those skilled in the art can be made in the specific procedures disclosed above without departing from the scope or spirit of the invention.

I claim:

1. A process for preparing a member selected from the group consisting of the esters, amides, and nitriles of α-haloacrylic acids which comprises dehydrohalogenating a member of the group consisting of the esters, amides and nitriles of dihalopropionic acids in which at least one halogen atom is in α-position, by heating in the presence of an aqueous solution of an organic amino acid having the same number of free amino groups and acid radicals.

2. A process for preparing an ester of α-chloroacrylic acid, which comprises dehydrochlorinating an ester of an α,β-dichloropropionic acid by heating in the presence of an aqueous solution of an organic amino acid having the same number of free amino groups and acid radicals.

3. A process for preparing an ester of α-chloroacrylic acid, which comprises dehydrochlorinating an ester of an α,β-dichloropropionic acid by heating at a temperature of 50 to 150° C. with an aqueous solution containing at least 1 mol of an organic amino acid having the same number of free amino groups and acid radicals, per molecular equivalent of α,β-dichloropropionic acid in said ester.

4. A process for preparing methyl α-chloroacrylate which comprises dehydrochlorinating methyl α,β-dichloropropionate by heating at boiling temperature with an aqueous solution of at least 1 mol of an organic amino acid having the same number of free amino groups and acid radicals, per mol of α,β-dichloropropionate, the concentration of said amino acid in said solution being at least 10%.

5. A process for preparing methyl α-chloroacrylate, which comprises dehydrochlorinating methyl α,β-dichloropropionate by heating at boiling temperature with an aqueous solution of at least 1 mol of glycine per mol of α,β-dichloropropionate, the concentration of said amino acid in said solution being at least 10%.

References Cited in the file of this patent

UNITED STATES PATENTS

| Number | Name | Date |
| --- | --- | --- |
| 2,386,694 | Lichty | Oct. 9, 1945 |

OTHER REFERENCES

Karrer: "Organic Chemistry" (Elsevier Publ. Co., New York, 2nd ed. of 1946), page 277.